US007976895B2

United States Patent
Faucheux et al.

(10) Patent No.: US 7,976,895 B2
(45) Date of Patent: Jul. 12, 2011

(54) METHOD FOR FABRICATING A FUEL CELL ON A POROUS SUPPORT

(75) Inventors: Vincent Faucheux, Lans en Vercors (FR); Christelle Laugier, Rives (FR); Jean-Yves Laurent, Domene (FR); Steve Martin, St. Sauveur (FR)

(73) Assignee: Commissariat a l'Energie Atomique, Paris (FR)

( * ) Notice: Subject to any disclaimer, the term of this patent is extended or adjusted under 35 U.S.C. 154(b) by 593 days.

(21) Appl. No.: 12/216,498

(22) Filed: Jul. 7, 2008

(65) Prior Publication Data

US 2009/0035456 A1   Feb. 5, 2009

(30) Foreign Application Priority Data

Aug. 2, 2007 (FR) ..................... 07 05652

(51) Int. Cl.
*H01M 8/00* (2006.01)
*H01M 8/10* (2006.01)
*H01M 2/00* (2006.01)
*H01M 2/08* (2006.01)

(52) U.S. Cl. ....... 427/115; 427/58; 427/123; 427/126.1; 427/180; 427/181; 427/189; 427/190; 427/191; 429/480; 429/481; 429/482; 429/483; 429/513; 429/535

(58) Field of Classification Search .................. 427/115; 429/480, 481, 482, 483, 513, 535
See application file for complete search history.

(56) References Cited

U.S. PATENT DOCUMENTS

| | | | |
|---|---|---|---|
| 2005/0053821 A1* | 3/2005 | Jang ............................... | 429/33 |
| 2006/0141339 A1 | 6/2006 | Roy et al. | |
| 2007/0072040 A1* | 3/2007 | Kouassi et al. ................ | 429/34 |
| 2007/0072070 A1 | 3/2007 | Quek et al. | |
| 2008/0061027 A1* | 3/2008 | Mangat et al. ................. | 216/17 |

FOREIGN PATENT DOCUMENTS

| | | |
|---|---|---|
| EP | 1 353 394 A1 | 10/2003 |
| EP | 1 772 921 A2 | 4/2007 |
| FR | 2 846 797 A1 | 5/2004 |
| FR | 2 880 200 A1 | 6/2006 |

OTHER PUBLICATIONS

Gurau et al., "Characterization of Transport Properties in Gas Diffusion Layers for Proton Exchange Membrane Fuel Cells: 2. Absolute Permeability", Journal of Power Source, vol. 165 Issue 2, (Mar. 2007), pp. 793-802.*

* cited by examiner

*Primary Examiner* — Michael Cleveland
*Assistant Examiner* — Lisha Jiang
(74) *Attorney, Agent, or Firm* — Oliff & Berridge, PLC

(57) ABSTRACT

To prevent the liquid electrolyte from penetrating into the porous support while at the same time preserving or increasing the power density of the fuel cell, before the liquid electrolyte is deposited, at least a part of the walls delineating the pores of said support is covered by a film formed by a material presenting a contact angle of more than 90° with a drop of said liquid electrolyte. Said film further presents a thickness enabling passage of the reactive fluid in the pores of the support.

13 Claims, 2 Drawing Sheets

METHOD FOR FABRICATING A FUEL CELL ON A POROUS SUPPORT

BACKGROUND OF THE INVENTION

The invention relates to a method for fabricating a fuel cell comprising at least formation of an assembly formed by a first electrode, a solid proton-conducting membrane and a second electrode on a support comprising pores delineated by walls, the membrane being formed by deposition and drying of a liquid electrolyte.

STATE OF THE ART

Fuel cells and more particularly fuel microcells are achieved by successive deposition on a support of an Electrode-Membrane-Electrode assembly, also called EME assembly, EME stack or cell core. Said support serves the purpose of securing the stack mechanically and, due to its porosity, it enables said EME assembly to be supplied with reactive fluid and more particularly with fuel, for example hydrogen, ethanol or methanol vapors.

An increasing need moreover exists for fuel cells having high power densities. For this, the thickness of the proton-conducting membrane has to be small, typically about 5 to 10 micrometers. In addition, formation of a homogeneous membrane with a thickness of 5 to 10 micrometers on a porous support requires said support to present a pore size smaller than this thickness.

Such a reduction of the dimensions of the components of a fuel cell does however give rise to capillarity problems. The solid proton-conducting membrane, generally formed by a proton-conducting perfluorosulfonic acid polymer such as the product marketed by Dupont de Nemours under the brand-name Nafion®, is in fact obtained by depositing a liquid (or liquid electrolyte) film, which is then hardened by drying. However, when the liquid electrolyte is deposited, the latter is likely to penetrate into the pores of the porous support due to the effect of capillary forces. This means that there is a risk of obstructing the pores of the support and therefore of blocking the passage of reactive fluid.

OBJECT OF THE INVENTION

The object of the invention is to provide a method for fabricating a fuel cell preventing solid electrolyte from penetrating into the porous support when formation of the solid proton-conducting membrane takes place, while at the same time preserving and possibly increasing the power density of said cell.

According to the invention, this object is achieved by the fact that a film, formed by a material presenting a contact angle of more than 90° with a drop of said liquid electrolyte, is formed on at least a part of the walls delineating the pores before deposition of the liquid electrolyte, said film having a thickness enabling the passage of a reactive fluid in said pores.

According to a first development of the invention, the material forming said film comprises at least a polymer presenting a contact angle of more than 90° with a drop of said liquid electrolyte. More particularly said film is formed by impregnating said support with a liquid solution comprising at least one solvent in which said material or at least one precursor of said material is dissolved, and in then evaporating said solvent.

According to a second development of the invention, the film is formed by chemical vapor deposition.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
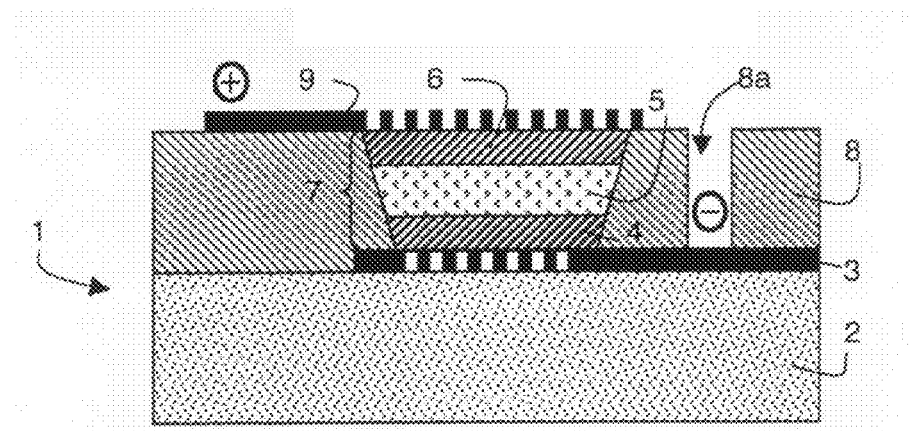
FIG. 1 schematically represents a cross-section of a particular embodiment of a fuel cell formed on a porous support.

To prevent the liquid electrolyte from penetrating into the porous support while at the same time preserving and possibly increasing the power density of the fuel cell, before the liquid electrolyte is deposited, at least a part of the walls delineating the pores of the support is covered by a film formed by a material presenting a contact angle θ of more than 90° with a drop of said liquid electrolyte. Said film moreover presents a thickness enabling passage of the reactive fluid in the pores of the support.

According to Laplace's equation, the capillary pressure causing a liquid to penetrate into a porous material is proportional to:

$$\sigma * \cos \theta / R$$

with:
- σ: viscosity of the deposited liquid,
- θ: contact angle between the liquid drop and the porous material, also called drop angle. Such an angle is measured at the interface between a liquid and a flat surface of a solid body when a drop of said liquid is deposited on said surface and it determines the degree of wettability of a liquid with a solid body.
- and R: radius or size of the pores of the porous material.

The capillary pressure is therefore inversely proportional to the size of the pores of a material porous. The smaller the pores, the higher the capillary pressure and the more penetration of the liquid electrolyte is enhanced. However to prevent penetration of the liquid electrolyte into the porous support, the size of the pores cannot be increased. The size of the pores of the porous support does in fact on the contrary have to be reduced to obtain high power densities.

However, the capillary pressure is also a function of the contact angle θ between the drop of liquid and the porous material. Consequently, to prevent penetration of the liquid electrolyte into the porous material, the capillary pressure has to be reduced by obtaining a negative cos θ value, i.e. a contact angle θ of more than 90°, which means that a drop of the liquid electrolyte does not wet at the surface of the porous support. For comparison purposes, a surface is said to be hydrophobic if it presents a contact angle θ of more than 90° with a water droplet.

The porous support is more particularly made from a ceramic, a glass, a metal, silicon, silicon carbide, carbon graphite or any association of these materials. The pores of the support can be formed by the free spaces formed between the grains of a sintered material, for example chosen from ceramics, glass, silicon carbide and a metal. The porous support can also be formed by fibers, for example glass, carbon or polymer fibers, and the free spaces arranged between said fibres form the pores of said support. According to an alternative embodiment, the pores of the support can also be formed by etching or drilling of a bulk material such as silicon, a metal or glass. The pores can be of any shape or, on the contrary, they can have a structured form, for example in the form of pass-through channels. The surface properties of the materials used to form the porous support do not however enable the liquid electrolyte used to form the solid proton-conducting membrane to be kept at the surface of said support.

A material presenting a contact angle θ of more than 90° with the liquid electrolyte is thus deposited on at least a part and advantageously on the whole of the walls delineating the pores of the support, before deposition of the liquid electrolyte. This enables the contact angle between the liquid electrolyte and the walls delineating the pores of the support to be modified, thereby reducing the capillary pressure, so as to ensure that the liquid electrolyte is kept at the surface of the porous support.

For example purposes, FIG. 1 represents a particular embodiment of a fuel cell 1. A part of a porous support 2 is covered by an anode current collector 3, itself partially covered by a successive stack of three thin layers respectively forming an anode 4, a membrane 5 for example made of Nafion® and a cathode 6. The stack of three thin layers thereby constitutes the EME assembly 7. An insulating thin layer 8 further covers the respective free parts of porous support 2 an of anodes current collector 3 and it surrounds the periphery of EME assembly 7. Said insulating thin layer 8 does however comprise an opening 8a releasing a zone of anode current collector 3 to enable formation of a negative connection terminal. Finally, a cathode current collector 9 covers cathode 6 and a part of insulating thin layer 8 and a positive connection terminal can be formed on cathode current collector 9. Furthermore, said membrane 5 advantageously has a thickness comprised between 5 and 10 micrometers.

The film covering the walls delineating the pores can be formed by a material comprising at least one polymer presenting a contact angle θ of more than 90° with a drop of the liquid electrolyte used to form electrolytic membrane 5. More particularly, the material is formed by such a polymer. The polymer is for example chosen from:
  polytetrafluorethylene (PTFE) and its derivatives,
  fluorinated ethylene-propylene (FEP),
  polyvinylidene fluoride (PVDF) and its derivatives,
  polyethylene (PE),
  polypropylene (PP),
  ethylene-propylene
  and thiols.

The polymer can also be a perfluorosulfonic acid proton-conducting polymer such as Nafion® or Hyflon® ION marketed by Solvay Solexis. The contact angle θ between the surface of a Nafion® (or Hyflon® ION) film and a drop of a liquid electrolyte designed to form a solid Nafion® (or Hyflon® ION) membrane is in fact greater than 90°.

More particularly, the contact angle between the polymers mentioned above and a liquid electrolyte such as Nafion® or Hyflon® ION is comprised between 130° and 150°.

Although these materials do present suitable surface properties to keep the electrolyte at the surface of the porous support, they are however very bad from a heat conduction point of view. They can therefore not be used as material constituting the porous support, for such a use would cause overheating and the fuel cell would cease to operate.

The material comprising at least one polymer is therefore formed on the walls delineating the pores of the support, more particularly by liquid impregnation. The support is impregnated with a liquid solution comprising at least one solvent in which said material is dissolved. The solvent(s) is(are) then evaporated so that the previously dissolved material deposits in solid form on said walls.

Figure 2:
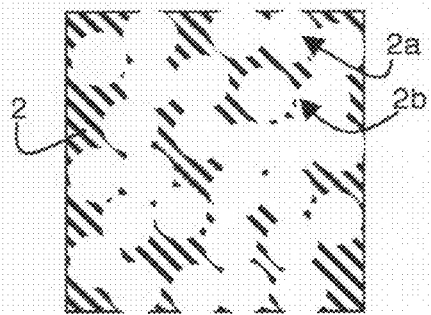
FIGS. 2 to 4 schematically illustrate cross-sections of different steps of formation of a film on the walls delineating the pores of a porous support, in a fabrication method of a cell according to FIG. 1.
Figure 3:
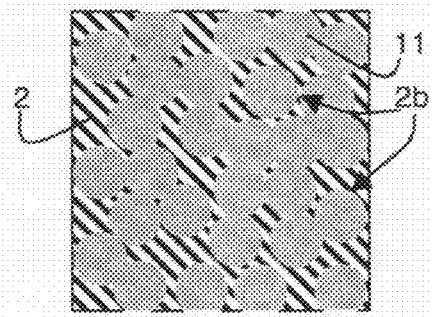
Figure 4:
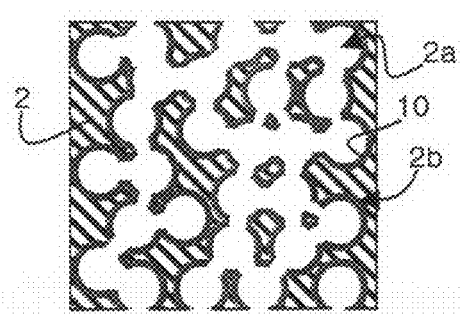

For example purposes, FIGS. 2 to 4 schematically illustrate the different steps of formation of a polymer film 10 on the walls delineating the pores of a support 2 during a fabrication method of a fuel cell 1 as represented in FIG. 1. In this embodiment, film 10 is formed by impregnating support 2 with a liquid solution 11 comprising a solvent and said material. Thus, as represented in FIGS. 2 and 3, porous support 2 comprising pores 2a delineated by walls 2b is impregnated with solution 11. The latter then penetrates into pores 2a of said support 2 and fills the latter completely. Then, as represented in FIG. 4, an evaporation step eliminates the solvent so that the material deposits on walls 2b of the support and forms film 10. The solvent composing solution 11 is for example evaporated in a vacuum and/or by heating. The solvent can for example be water and/or one or more alcohols. Furthermore, the evaporation temperature of the solvent is lower than the temperature at which the material is liable to be degraded or damaged (according to the case, melting temperature, vitreous transition temperature . . . ).

The quantity of material in solution 11 must be sufficient for the walls of the pores to be covered by a film 10 having a sufficient thickness, for example more than 1 nm. However, the thickness of the film must not be too great, as film 10 must not clog up pores 2a and thereby obstruct the passage or diffusion of the reactive fluid.

Once film 10 has been deposited, anode current collector 3, anode 4, membrane 5, cathode 6, cathode current collector 9 and insulating layer 8 are formed on said support, without there being any risk of the liquid electrolyte penetrating into the pores of the support. Membrane 5 is formed by deposition of a liquid electrolyte, for example by coating, by spray coating, by a micro-dispensing system, or by ink jet deposition: this is followed by drying of the liquid electrolyte.

In an alternative embodiment, anode current collector 3 and anode 4 can be deposited on porous support 2 before film 10 is formed. This embodiment is only suitable for the case where the material forming film 10 comprises a perfluorosulfonic acid proton-conducting polymer such as Nafion® or Hyflon® ION. In this case, even if the anode comprises polymer residues, the latter do not in fact hinder passage of the protons between the anode and electrolyte. In addition, the presence of this polymer on the walls of the pores of the anode enables a volume interface and not a surface interface to be created between the anode and the electrolyte.

For example, a liquid solution comprising 95% solvent (water+alcohols) and 5% Nafion® was used to impregnate a ceramic porous support, for example made of alumina, for example by coating. The impregnation step was performed after deposition of an anode current collector formed for example by a layer of gold with a thickness of 1 µm, and deposition of an anode formed for example by a layer of carbon on platinum with a thickness of 5 µm. The ceramic porous support has a thickness of 500 micrometers with a mean pore size of about 5 micrometers and a volume fraction of pores of 50%. 1 $cm^2$ of porous ceramic surface therefore comprises a total volume of pores representing 25 $mm^3$. 25 $mm^3/cm^2$ of liquid solution are therefore required to impregnate the total volume of the pores. The solvent is then evaporated during 1 hour at C in a furnace so that the Nafion® deposits on the walls delineating the pores. After evaporation of the solvent, the thickness of the Nafion® film is about 40 nm. This thickness enables any problem of reactive fluid diffusion, and more particularly of hydrogen, to be avoided, as no pores are obstructed by the presence of said film. The liquid electrolyte is then deposited by coating and dried to obtain for example a solid Nafion® membrane. After formation of the cathode and of the cathode current collector, the fuel cell was tested. The power obtained does not indicate any hydrogen diffusion problem, unlike a cell produced under the same conditions but without formation of a film covering the walls delineating the pores of the support.

According to an alternative embodiment, instead of containing the material designed to form film 10, solution 10 can contain a precursor of said material. Thus, for a film 10 containing a polymer having a contact angle θ of more than 90° with a drop of the liquid used to form membrane 5, solution 10 used for impregnation can contain a monomer of said polymer. In this case, said monomer is polymerized by any suitable type of means before evaporation of the solvent, so that the contact angle θ of the polymer obtained by polymerization is greater than 90°.

Likewise, the precursor of said material can be a compound presenting surface properties that are able to be modified by the action of thermal, ultraviolet or infrared treatment. More particularly, the contact angle θ of said compound with a drop of liquid electrolyte only becomes greater than 90° after it has been subjected to treatment such as thermal, ultraviolet or infrared treatment. This is for example the case of thiols whose contact angle can be modified under infrared or ultraviolet treatment. In this case, such a treatment is performed after the solvent evaporation step.

Figure 5:
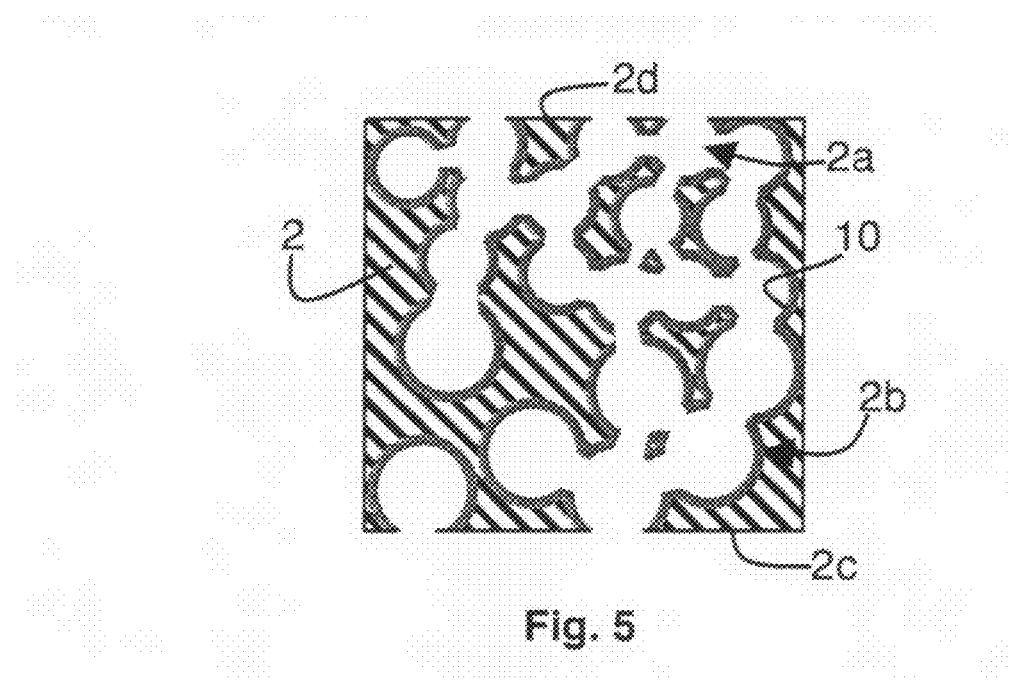
FIGS. 5 and 6 schematically represent cross-sections of two alternative embodiments of a porous support.

In FIGS. 2 to 4, support 2 is a support formed by a single material and the size of pores 2a in support 2 is substantially constant. It is advantageously smaller than the thickness of the proton-conducting membrane and more particularly smaller than 10 micrometers. It may on the other hand be advantageous to have a support presenting a porosity gradient, i.e. a porosity varying according to the thickness of the support. More particularly, as represented in FIG. 5, support 2 comprises two opposite surfaces 2c and 2d, surface 2d being designed to receive the EME assembly. Furthermore, the porosity in support 2 is decreasing from surface 2c to surface 2d. In FIG. 5, the pores located near to surface 2c are in fact of larger size than the pores located near to surface 2d. Advantageously, the pores located near to surface 2c have a larger size than the thickness of the proton-conducting membrane (for example 10 micrometers) whereas the pores located near to surface 2d have a smaller mean size than the thickness of the proton-conducting membrane. Such a porosity gradient does in fact enable the capillary forces to be reduced thereby making it easier to keep the liquid electrolyte at the surface of the porous support. Preferably, in the case of pores achieved by structuring (for example etching or drilling), such as pores having the form of pass-through channels, the latter advantageously have a frustum shape tapered towards surface 2c.

Figure 6:
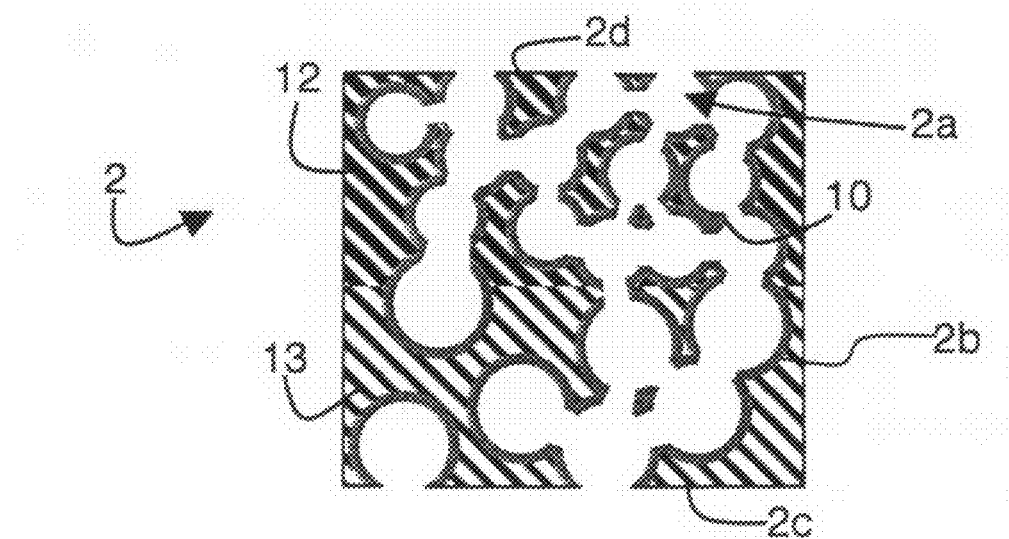

According to an alternative embodiment and as represented in FIG. 6, the support can be formed by a stack of two superposed layers 12 and 13 having different porosities respectively smaller and larger than the thickness of the proton-conducting membrane (for example 10 micrometers). The two superposed layers 12 and 13 can be formed by different materials or by the same material but having two porosities of different shapes. For example layer 13 can comprise pass-through channels creating a first porosity whereas layer 12 can present pores of any shape but of smaller size than that of layer 13.

The polymer or polymers used to form film 10 can be replaced by other materials having a contact angle θ of more than 90° with a drop of the liquid electrolyte used to form the solid membrane. For example, the material forming film 10 can be constituted by metallic, ceramic or graphite carbon particles presenting a contact angle θ of more than 90° with a drop of the liquid electrolyte. Film 10 is for example formed by chemical vapor deposition (CVD), physical vapor deposition (PVD), sedimentation, bath, coating, or spray coating. Moreover, if said particles do not themselves present a contact angle θ of more than 90°, these particles can be coated by a coating formed by a polymer presenting a contact angle θ of more than 90° with a drop of said liquid electrolyte.

Formation of film 10 is therefore not limited to the liquid channel impregnation technique. More particularly, film 10 can be deposited on at least a part of the walls delineating the pores of the support by a chemical vapor deposition (CVD) method such as plasma enhanced chemical vapor deposition (PECVD) or chemical vapor deposition from metallo-organic precursors (MOCVD). The material forming film 10 can for example be silicon oxycarbide (SiOC), polydimethylsiloxane (PDMS) or amorphous carbon. The contact angle formed by a drop of liquid electrolyte on a flat surface of such a material is in fact greater than 90° and advantageously comprised between 130° and 170°. This CVD technique in particular enables a conformal film, i.e. a film having a constant thickness, to be deposited by chemical decomposition in gaseous phase. It further presents the advantage of being able to infiltrate gases into a porous material. Consequently, a thin film 10 can be achieved directly around each pore of the porous support without requiring prior impregnation by liquid channel and a solvent evaporation step.

We claim:

1. A method for fabricating a fuel cell comprising at least formation of an assembly formed by:
    depositing a first current collector plate,
    depositing a first electrode,
    forming a solid proton-conducting membrane by deposition and drying of an electrolyte dispersion,
    depositing a second electrode, and
    depositing a second current collector plate on a support comprising pores delineated by walls, wherein a film, formed by a material presenting a contact angle of more than 90° with a drop of said electrolyte dispersion, is formed on at least a part of the walls delineating the pores before deposition of the electrolyte dispersion, said film having a thickness enabling a reactive fluid to pass in said pores.

2. The method according to claim 1, wherein the material forming said film comprises at least one polymer presenting a contact angle of more than 90° with a drop of said electrolyte dispersion.

3. The method according to claim 2, wherein the polymer is selected from the group consisting of:
    polytetrafluorethylene and its derivatives,
    fluorinated ethylene-propylene,
    polyvinylidene fluoride and its derivatives,
    polyethylene,
    polypropylene,
    ethylene-propylene
    thiols,
    and a perfluorosulfonic acid proton-conducting polymer.

4. The method according to claim 3, wherein the polymer being a perfluorosulfonic acid proton-conducting polymer, the first electrode is produced before formation of the film.

5. The method according to claim 2, wherein said film is formed by impregnating said support with a liquid solution comprising at least one solvent in which said material is dissolved, and then by evaporating said solvent.

6. The method according to claim 2, wherein said film is formed by impregnating said support with a liquid solution comprising at least one solvent in which at least one precursor of said material is dissolved, and then by evaporating said solvent.

7. The method according to claim 6, wherein said precursor is formed by a monomer presenting a contact angle of more than 90° with a drop of said electrolyte dispersion, after polymerization.

8. The method according to claim 6, wherein the precursor of said material is a compound presenting a contact angle of more than 90° with a drop of said electrolyte dispersion, after thermal, ultraviolet or infrared treatment, said treatment being performed after evaporation of the solvent.

9. The method according to claim 1, wherein the material forming said film is constituted by metallic, ceramic or graphite carbon particles presenting a contact angle of more than 90° with a drop of the electrolyte dispersion.

10. The method according to claim 1, wherein the material forming said film is constituted by metallic, ceramic or graphite carbon particles covered with a coating formed by a polymer presenting a contact angle of more than 90° with a drop of the electrolyte dispersion.

11. The method according to claim 1, wherein the film is formed by chemical vapor deposition.

12. The method according to claim 1, wherein the support, provided with opposite first and second surfaces, presents a decreasing porosity from the first surface to the second surface, the assembly formed by the first current collector plate, the first electrode, the solid proton-conducting membrane, the second electrode, and the second current collector plate being formed on the second surface of said support.

13. The method according to claim 12, wherein the support is formed by a stack of two superposed layers having different porosities respectively smaller and larger than the thickness of the solid proton-conducting membrane.

* * * * *